United States Patent
Lee

(10) Patent No.: US 8,446,052 B2
(45) Date of Patent: May 21, 2013

(54) HEAT DISSIPATING DEVICE WITH DELAY FUNCTION AND ELECTRONIC APPARATUS USING SAME

(75) Inventor: Chia-Lin Lee, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 370 days.

(21) Appl. No.: 12/875,137

(22) Filed: Sep. 3, 2010

(65) Prior Publication Data
US 2012/0033386 A1 Feb. 9, 2012

(51) Int. Cl.
*H02J 7/00* (2006.01)
(52) U.S. Cl.
USPC .......................................... 307/150

(58) Field of Classification Search
USPC ........................................... 307/150
See application file for complete search history.

(56) References Cited

U.S. PATENT DOCUMENTS 5,848,282 A * 12/1998 Kang ............................ 713/323

\* cited by examiner

*Primary Examiner* — Robert L. Deberadinis
(74) *Attorney, Agent, or Firm* — Altis Law Group, Inc.

(57) ABSTRACT

A heat dissipating device is used in an electronic apparatus. The electronic apparatus includes a standby unit and a power supply. The heat dissipating device includes a delay unit connected to the standby unit, a switch connected to the delay unit and the power supply, and a heat sink connected to the switch. The delay unit turns on the switch when the electronic apparatus operates in a working mode, and the delay unit turns off the switch after a predetermined delay time when the electronic apparatus enters a standby mode.

10 Claims, 2 Drawing Sheets

HEAT DISSIPATING DEVICE WITH DELAY FUNCTION AND ELECTRONIC APPARATUS USING SAME

BACKGROUND

1. Technical Field

The present disclosure relates to heat dissipating devices, and particularly, to a heat dissipating device with a delay function and an electronic apparatus using the device.

2. Description of Related Art

Electronic apparatuses, such as computers and set top boxes, include standby modes. When the electronic apparatus enters into the standby mode, electronic components of the electronic apparatus, except a standby unit of the electronic apparatus, are shut down to save power. Yet, certain electronic components, such as a CPU of the electronic apparatus, may still be hot and may suffer damage. Thus, what is needed is a heat dissipating device which overcomes the above shortcoming.

BRIEF DESCRIPTION OF THE DRAWINGS

Many aspects of the embodiments can be better understood with reference to the following drawing. The components in the drawing are not necessarily drawn to scale, the emphasis instead being placed upon clearly illustrating the principles of the present disclosure.

DETAILED DESCRIPTION

Figure 1:
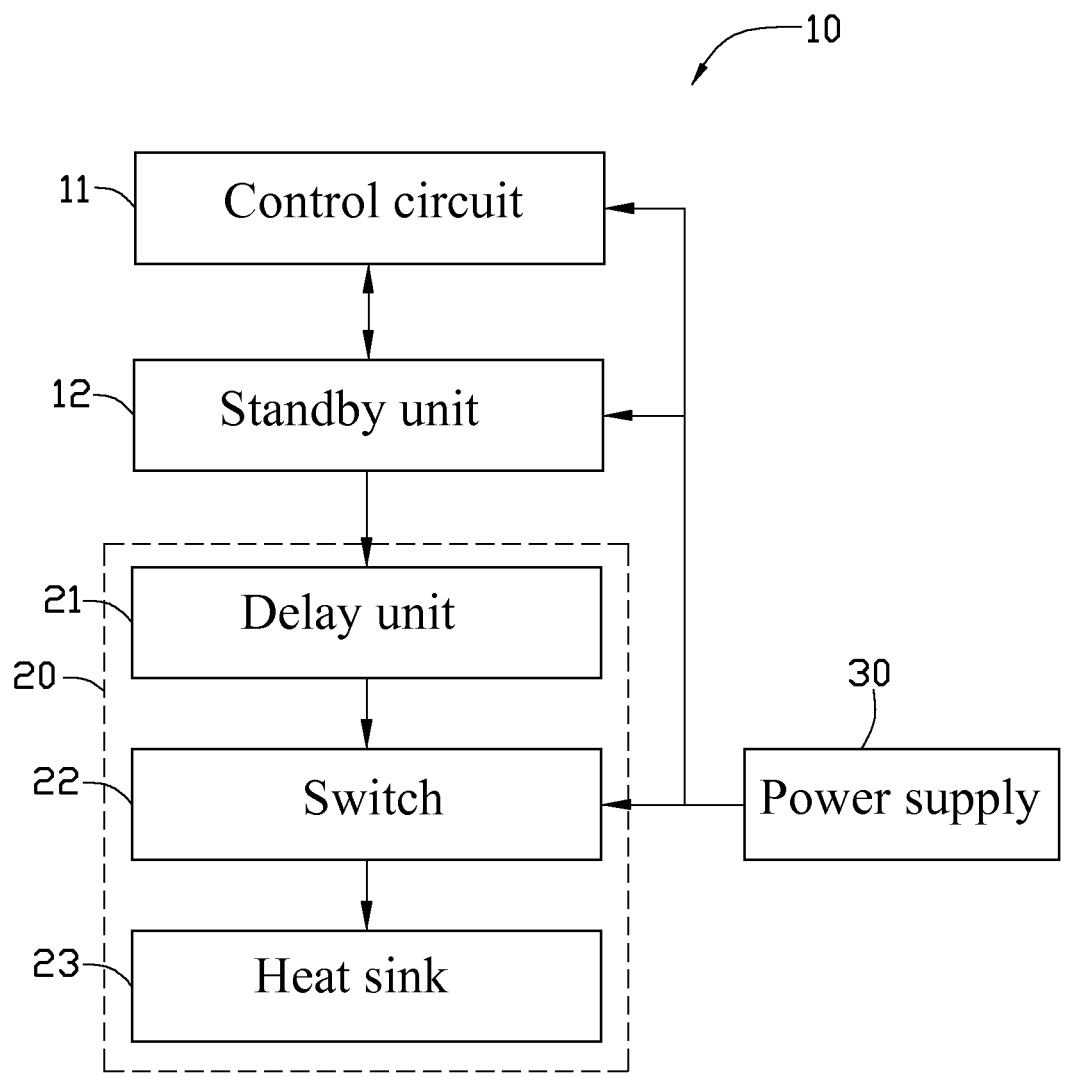
FIG. 1 is a block diagram of an electronic apparatus with a heat dissipating device according to an exemplary embodiment.

Referring to FIG. 1, an electronic apparatus 10 with a heat dissipating device 20 according to an exemplary embodiment is disclosed. The electronic apparatus 10 includes a control circuit 11, a standby unit 12, the heat dissipating device 20, and a power supply 30. The electronic apparatus 10 can operate in a working mode or in a standby mode.

The control circuit 11 may include a CPU, memory, and other components. When the electronic apparatus 10 operates in the working mode, the control circuit 11 executes functions of the electronic apparatus 10. When the electronic apparatus operates in the standby mode, the control circuit 11 is shut down in order to save power.

The standby unit 12 is connected to the control circuit 11. In one embodiment, the standby unit 12 is a programmable system-on-chip (PSOC). The standby unit 12 is ready to receive a user's instruction during the time the electronic apparatus 10 is in the standby mode. When receiving a start up instruction, the standby unit 12 awakens the control circuit 11, which returns the electronic apparatus 10 to the working mode. The standby unit 12 sends out a control signal to the heat dissipating device 20 according to an operating mode of the electronic apparatus 10. For example, when the electronic apparatus 10 is in the working mode, the control signal is a high level working signal, which can be considered as logical 1, otherwise, the control signal is a low level standby signal, which can be considered as logical 0.

The heat dissipating device 20 is connected to the standby unit 12. The heat dissipating device 20 continues operating for a predetermined delay time T when the electronic apparatus 10 enters the standby mode, to continue dissipating heat of the electronic apparatus 10.

The power supply 30 is connected to the control circuit 11, the standby unit 12, and the heat dissipating device 20 for supplying power to the above components.

The heat dissipating device 20 includes a delay unit 21 connected to the standby unit 12, a switch 22 connected to the delay unit 21, and a heat sink 23 connected to the switch 22. The power supply 30 is connected to the switch 22. In one embodiment, the heat sink 23 is a fan. The delay unit 21 is used for closing the switch 22 when the standby unit 12 sends out the working signal to the delay unit 21, so that the power supply 30 can supply power to the heat sink 23 through the switch 22. The delay unit 21 is also used for opening the switch 22 after the predetermined delay time T counted from when the standby unit 12 sends out the standby signal to the delay unit 21, so that the heat sink 23 can continue operating for time T.

Figure 2:
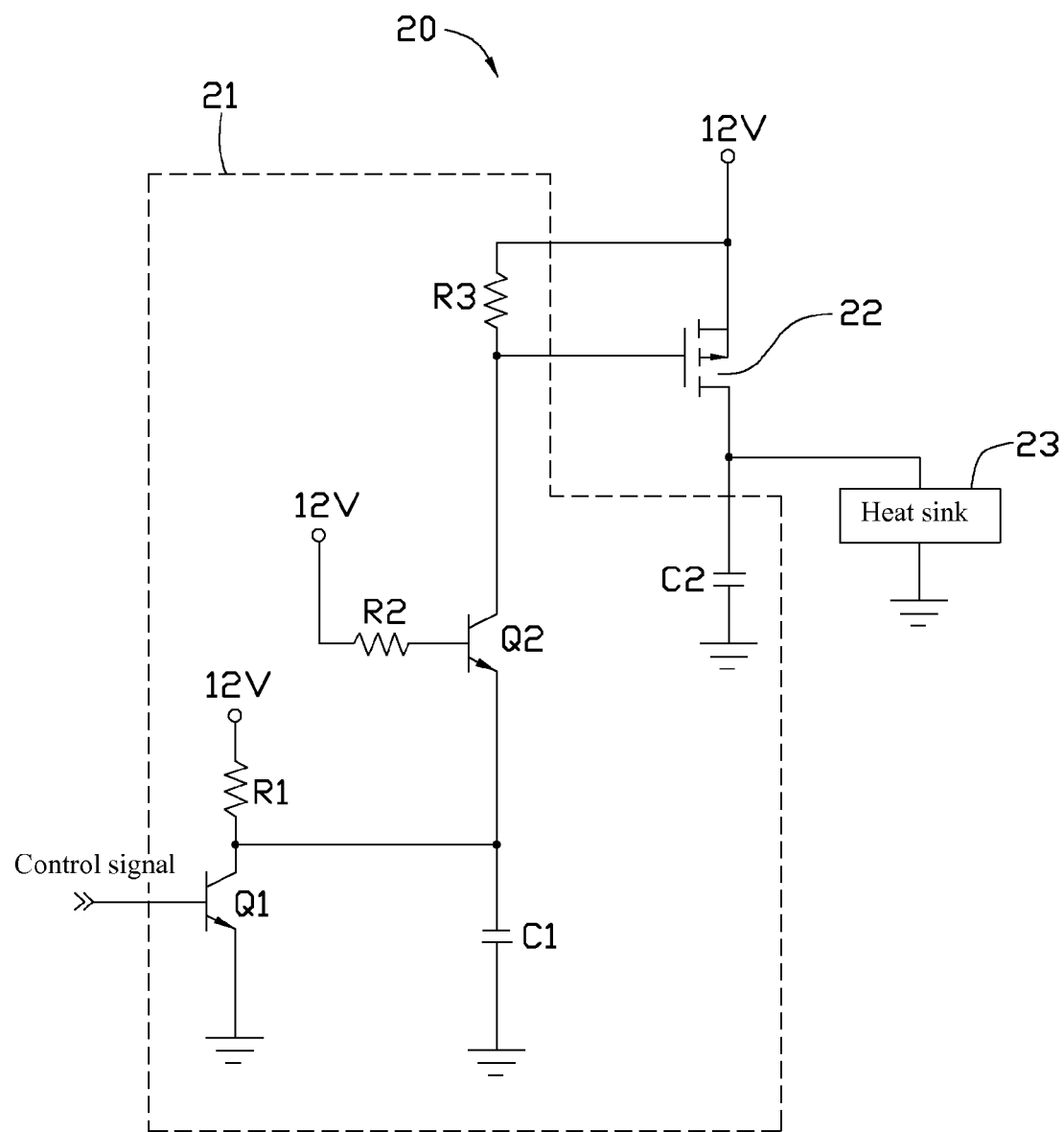
FIG. 2 is a circuit diagram of one embodiment of the heat dissipating device of FIG. 1.

Referring to FIG. 2, the power supply 30 can be a 12 volt direct current power supply, for example. The switch 22 is a metal-oxide-semiconductor field effect transistor (MOSFET). The delay unit 21 is a resistor-capacitor circuit (RC circuit), and includes a first transistor Q1, a second transistor Q2, a first capacitor C1, a second capacitor C2, a first resistor R1, a second resistor R2, and a third resistor R3.

The transistors Q1 and Q2 are npn type transistors. The base of the first transistor Q1 is connected to the standby unit 12. The emitter of the first transistor Q1 is grounded. The collector of the first transistor Q1 is both connected to the power supply 30 by the first resistor R1 and to the emitter of the second transistor Q2. The emitter of the second transistor Q2 is also grounded through the first capacitor C1. The base of the second transistor Q2 is connected to the power supply 30 by the second resistor R2. The collector of the second transistor Q2 is connected to the power supply 30 by the third resistor R3. The gate of the switch 22 is connected to the collector of the second transistor Q2. The source of the switch 22 is connected to the power supply 30, and the drain of the switch 22 is grounded through the second capacitor C2 and connected to the heat sink 23. The second capacitor C2 is used for stabilizing the direct current to the heat sink 23.

When the control signal from the standby unit 12 is the high level working signal, the first transistor Q1 is turned on, thus turning on the second transistor Q2 and the switch 22 in sequence. The power supply 30 supplies power to the heat sink 23.

When the control signal is shifted to the low level standby signal, the first transistor Q1 is cut off. The first capacitor C1 begins discharging, thus keeping the second transistor Q2 and the switch 22 on. The heat sink 23 continues to work for dissipating heat of the electronic apparatus 10. After the delay time T, the first capacitor C1 is completely discharged, the second transistor Q2 and the switch 22 are cut off, and the heat sink 23 stops working.

The predetermined delay time T of the delay unit 21 is determined by the resistance value of the second resistor R2 and the capacitance value of the first capacitor C1, calculated as $T = R2 * C1$.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A heat dissipating device used in an electronic apparatus, the electronic apparatus comprising a standby unit and a power supply, the heat dissipating device comprising:

a delay unit connected to the standby unit;

a switch connected to the standby unit via the delay unit, and connected to the power supply; and a fan electrically connected to the switch; wherein the standby unit sends out a high level working signal to the delay unit when the electronic apparatus operates in a working mode, the delay unit turns on the switch when the delay unit receives the high level working signal; and the standby unit sends out a low level standby signal to the delay unit when the electronic apparatus enters a standby mode, the delay unit turns off the switch after a predetermined delay time when the delay unit receives the low level standby signal.

2. The heat dissipating device of claim 1, wherein the delay unit comprises a first transistor, a second transistor, a first capacitor, a first resistor, and a second resistor, the base of the first transistor is connected to the standby unit, the emitter of the first transistor is grounded, the collector of the first transistor is connected to both the power supply through the first resistor and the emitter of the second transistor, the emitter of the second transistor is further grounded by the first capacitor, the base of the second transistor is connected to the power supply by the second resistor, and the collector is connected to the switch.

3. The heat dissipating device of claim 2, wherein the delay unit further comprises a third resistor, the switch is a metal-oxide-semiconductor field effect transistor, the gate of the switch is connected to the collector of the second transistor, the source of the switch is connected to the power supply, the drain of the switch is electrically connected to the fan, and the third resistor is connected in parallel with the gate and the source of the switch.

4. The heat dissipating device of claim 3, wherein the delay unit further comprises a second capacitor, the drain of the switch is grounded by the second capacitor.

5. An electronic apparatus, comprising:
 a standby unit;
 a power supply; and
 a heat dissipating device comprising:
  a delay unit connected to the standby unit;
  a switch connected to the standby unit via the delay unit, and connected to the power supply; and
  a fan electrically connected to the switch; wherein
  the electronic apparatus comprises a working mode and a standby mode, the standby unit makes the delay unit turn on the switch when the electronic device operates in the working mode, and the standby unit makes the delay unit cut off the switch after a predetermined delay time when the electronic device enters the standby mode.

6. The electronic apparatus of claim 5, further comprising a control circuit for executing functions of the electronic apparatus when the electronic apparatus operates in the working mode.

7. The electronic apparatus of claim 5, wherein the standby unit is configured for sending out a high level working signal to the delay unit when the electronic apparatus operates in the working mode, and sending out a low level standby signal to the delay unit when the electronic apparatus enters the standby mode.

8. The electronic apparatus of claim 7, wherein the delay unit comprises a first transistor, a second transistor, a first capacitor, a first resistor, and a second resistor, the base of the first transistor is connected to the standby unit, the emitter of the first transistor is grounded, the collector of the first transistor is connected to both the power supply by the first resistor and to the emitter of the second transistor, the emitter of the second transistor is further grounded through the first capacitor, the base of the second transistor is connected to the power supply by the second resistor, and the collector is connected to the switch.

9. The electronic apparatus of claim 8, wherein the delay unit further comprises a third resistor, the switch is a metal-oxide-semiconductor field effect transistor, the gate of the switch is connected to the collector of the second transistor, the source of the switch is connected to the power supply, the drain of the switch is electrically connected to the fan, and the third resistor is parallel connected to the gate and the source of the switch.

10. The electronic apparatus of claim 9, wherein the delay unit further comprises a second capacitor, the drain of the switch is grounded through the second capacitor.

* * * * *